(No Model.)
W. HILLMAN & J. F. RIPPLE.
BALING PRESS.
No. 411,501. Patented Sept. 24, 1889.
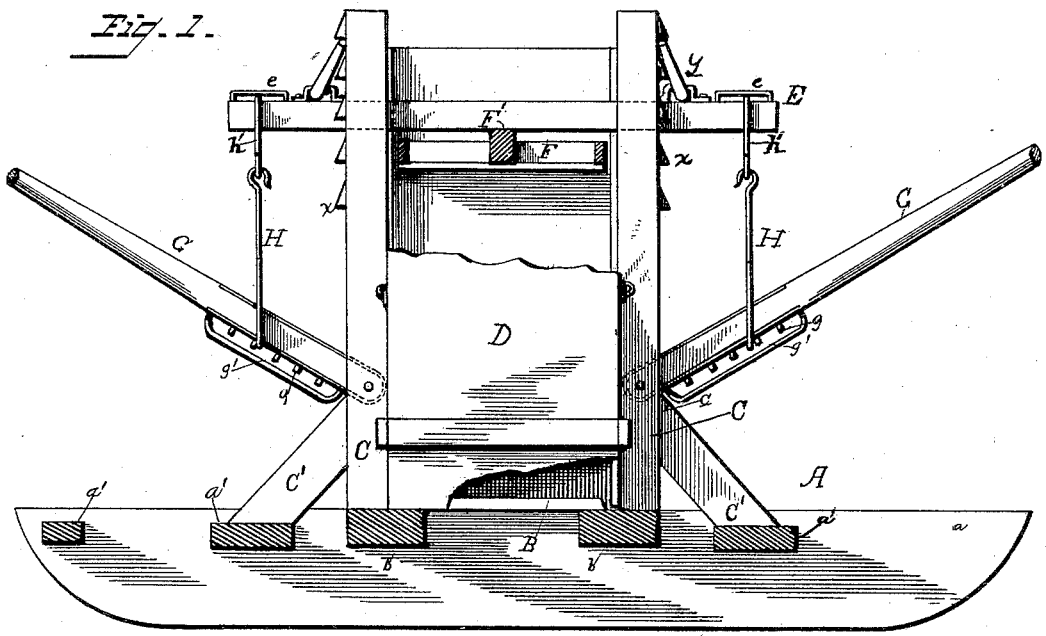
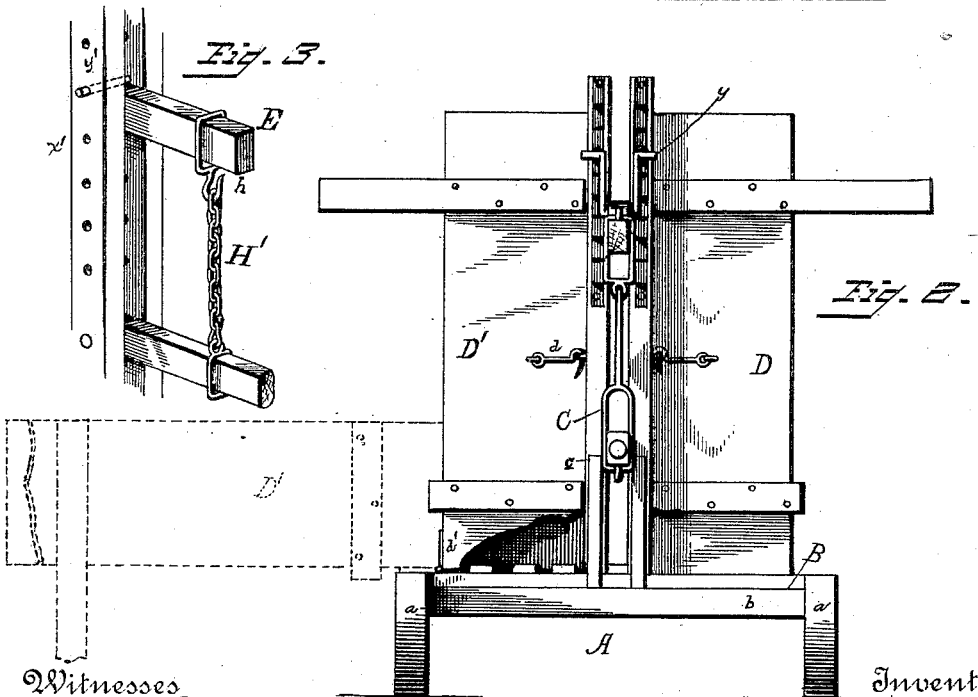

UNITED STATES PATENT OFFICE.

WILLIAM HILLMAN AND JOSEPH F. RIPPLE, OF SCHULENBURG, TEXAS.

BALING-PRESS.

SPECIFICATION forming part of Letters Patent No. 411,501, dated September 24, 1889.

Application filed April 8, 1889. Serial No. 306,380. (No model.)

*To all whom it may concern:*

Be it known that we, WILLIAM HILLMAN and JOSEPH F. RIPPLE, both citizens of the United States, and both residing in Schulenburg, in the county of Fayette and State of Texas, have invented certain new and useful Improvements in Baling-Presses, of which the following is a specification.

The object of our invention is to provide a baling-press specially designed for baling hay, constructed with mechanism to apply sufficient power for compressing the hay, readily moved from place to place, conveniently opened, manufactured at a small cost, and easily operated.

Our invention consists in the improved organizations of instrumentalities hereinafter described and claimed.

In the accompanying drawings, illustrating our invention, Figure 1 is a front elevation, partly in section, of our improved baling-press; Fig. 2, a side view of the same, partly broken away, and Fig. 3 shows certain details of construction.

The press is preferably mounted on a sled or carriage A, consisting of side runners $a$, connected by cross-bars $a'$. The platform B is secured to the runners about midway between their ends and between sills $b$, which are sufficiently stout and heavy to support uprights C and to sustain the baling pressure. The uprights C are preferably made each in two parts, or bifurcated, as shown, and each part is braced at its lower end by an inclined brace-beam C', secured to the adjacent cross-piece $a'$ and to the uprights C at $c$. On each side of the uprights are casing-sections D and D'. The section D is rigidly secured to the base-plate and to the uprights, while the section D' is removably secured thereto by means of fastening devices $d$, hinges $d'$ being shown. By this means the baling-chamber may be opened to remove the baled hay. The section D' is preferably secured to one of the runners $a$ and to the base-plate, so that it may be turned down, as shown in dotted lines, Fig. 2, to form a trough, by means of which the hay may be slid from the baling-chamber onto the ground.

The compressing-beam E extends horizontally across the baling-chamber through the uprights and bears on the follower F, or preferably on a block F', mounted on the top of the follower. To each upright, near its lower end, is hinged an operating-lever G, and each lever is connected by means of a chain H' to a hook $h$, as shown in Fig. 3, on the outer end of the compressing-beam E; or, as shown in Figs. 1 and 2, links H, engaging with loops $h'$, hung on the beam E and free to slide in straps $e$, may be employed. The links H at their lower ends engage with teeth $g$ on the levers G, which are inclosed by straps $g'$.

The uprights C may be provided with detent-teeth $x$, which work in connection with pawls $y$, hinged or pivoted on the beam E. The pawls slip over the teeth as the beam E is forced down and lock it against upward movement; or the uprights may be provided with a series of transverse apertures $x$, through which pins $y'$ (see Fig. 3) may be passed for the same purpose.

The method of operation is as follows: The baling-chamber is closed and hay is placed therein, while the follower is removed. The follower is then placed in position and the levers are depressed, so as to crowd the follower down upon the hay. The detent devices prevent the beam from moving upwardly when pressure on the levers is relieved. The levers are then elevated, and the chains taken up and the lower links attached to the hooks $h$. Either both or one of the levers are then depressed to further compress the hay by means of the follower into the baling-chamber. This operation is continued until the hay is sufficiently compressed, when the section D' is turned down and the baled hay is removed.

What we claim as of our own invention is—

1. The combination, substantially as hereinbefore set forth, of the base-plate, the casing made in two trough-shaped sections D and D', one of which is hinged to the base-plate, the bifurcated uprights, the operating-levers on each side hinged to the uprights, the compressing-beam extending across the baling-chamber and through the uprights, and connections between the compressing-beam and the levers.

2. The combination, substantially as hereinbefore set forth, of the base-plate, the casing made in two trough-shaped sections D and D', one of which is hinged to the base-plate, the bifurcated uprights C, the operating-levers on each side hinged to the uprights, the sled, the braces C', secured to the sled and to the uprights, the compressing-beam extending across the baling-chamber and through the uprights, the hooks on the outer ends of the compressing-beam and the chains connecting the operating-levers with the hooks, whereby the connections between the levers and the compressing-beam may be adjusted.

3. The combination, substantially as hereinbefore set forth, of the base-plate, the casing made in two trough-shaped sections D and D', one of which is hinged to the base-plate, the bifurcated uprights C, the operating-levers G on each side hinged to the uprights, the compressing-beam extending through the uprights, the loops $h'$, attached to the outer ends of the compressing-beam, the straps $e$ surrounding the loops, the links H', having hooked ends engaging with the loops $h'$, the teeth $g$ on the operating-levers with which the lower ends of the links H' engage, and the straps $g'$, inclosing the teeth.

In testimony whereof we have hereunto subscribed our names.

WILLIAM HILLMAN.
JOS. F. RIPPLE.

Witnesses:
  E. C. KAUFFMAN,
  A. F. KAUFFMAN.